July 25, 1950 J. H. VOSS 2,516,814

ADAPTER CIRCUIT FOR ESTABLISHING CONNECTIONS BETWEEN AUTOMATIC AND MAGNETO TYPE SUBSCRIBERS

Filed July 2, 1947 3 Sheets-Sheet 1

INVENTOR.
JOHN H. VOSS

BY Chas. W. Candy

ATTORNEY

July 25, 1950 J. H. VOSS 2,516,814

ADAPTER CIRCUIT FOR ESTABLISHING CONNECTIONS BETWEEN AUTOMATIC AND MAGNETO TYPE SUBSCRIBERS

Filed July 2, 1947 3 Sheets-Sheet 2

INVENTOR.
JOHN H. VOSS

BY Chas. W. Candy

ATTORNEY

July 25, 1950 J. H. VOSS 2,516,814

ADAPTER CIRCUIT FOR ESTABLISHING CONNECTIONS BETWEEN AUTOMATIC AND MAGNETO TYPE SUBSCRIBERS

Filed July 2, 1947 3 Sheets-Sheet 3

INVENTOR.
JOHN H. VOSS

BY

ATTORNEY

Patented July 25, 1950 2,516,814

UNITED STATES PATENT OFFICE 2,516,814

ADAPTER CIRCUIT FOR ESTABLISHING CONNECTIONS BETWEEN AUTOMATIC AND MAGNETO TYPE SUBSCRIBERS

John H. Voss, Rochester, N. Y., assignor to Automatic Electric Laboratories, Inc., Chicago, Ill., a corporation of Delaware Application July 2, 1947, Serial No. 758,607

8 Claims. (Cl. 179—84)

This invention relates, in general, to telephone systems and, more particularly, to an adapter circuit whereby parties in an automatic exchange may ring subscribers on a connecting magneto party line.

The object of this invention is to provide a magneto line adapter circuit of novel and improved design, individual to the magneto line, to thereby allow use of the equipment ordinarily associated with an automatic exchange in completing calls to magneto party lines.

A feature of the invention is the manner in which the sustained code ringing applied to the magneto line is terminated by application of ringing current to the line by the called subscriber.

Another feature of the invention is the manner in which means in the adapter circuit is operated responsive to an operation by a party on the magneto line to at times establish a connection and at other times to terminate ringing signals to the line.

A further feature of the invention is the manner in which the called subscriber can terminate ringing current to the magneto line either before or after answering the call.

A further feature of the invention is the manner in which the called subscriber may terminate the application of ringing current to the line only by an operation which is sustained for a predetermined interval of time.

Figure 1:
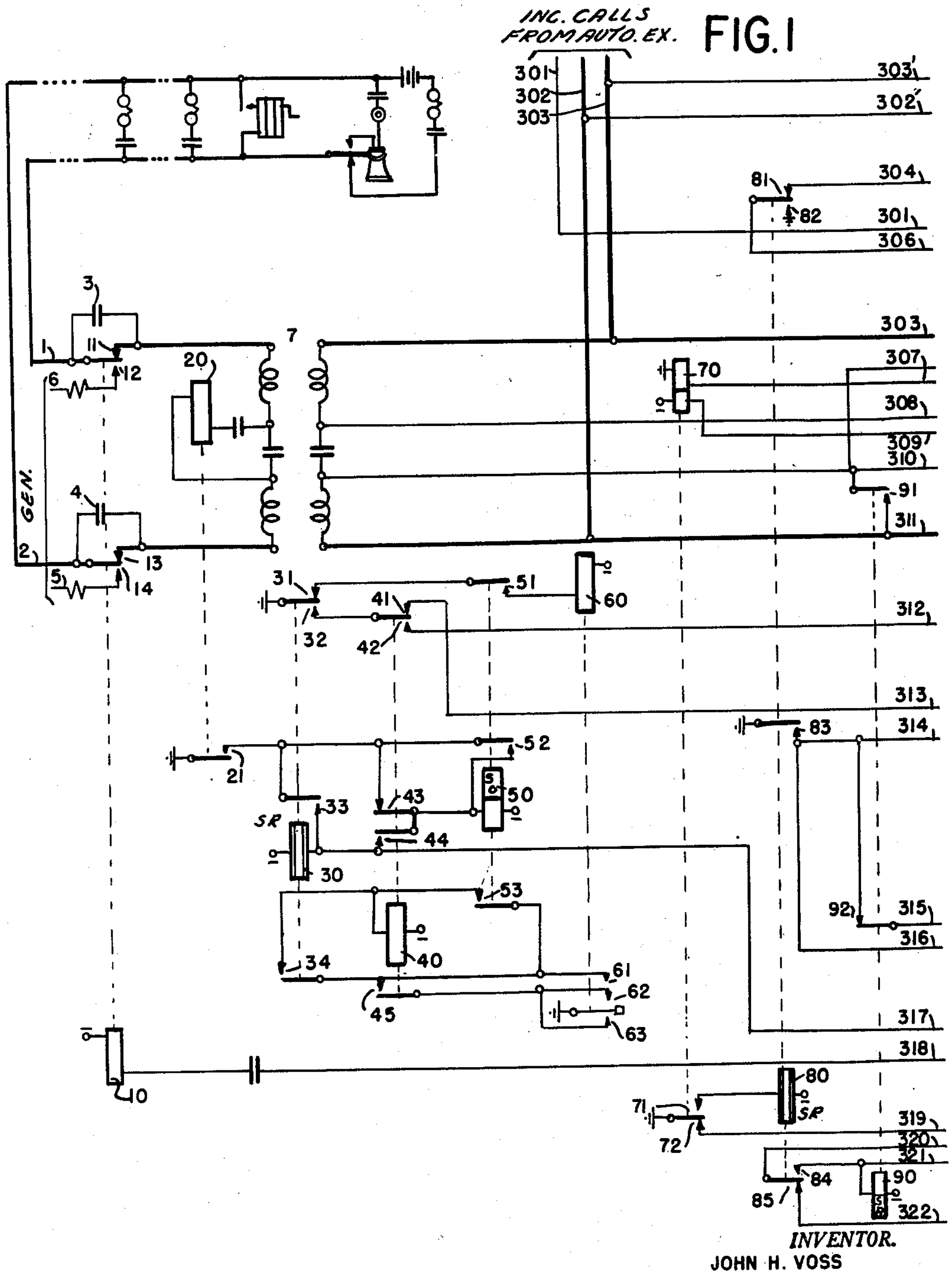
Figure 2:
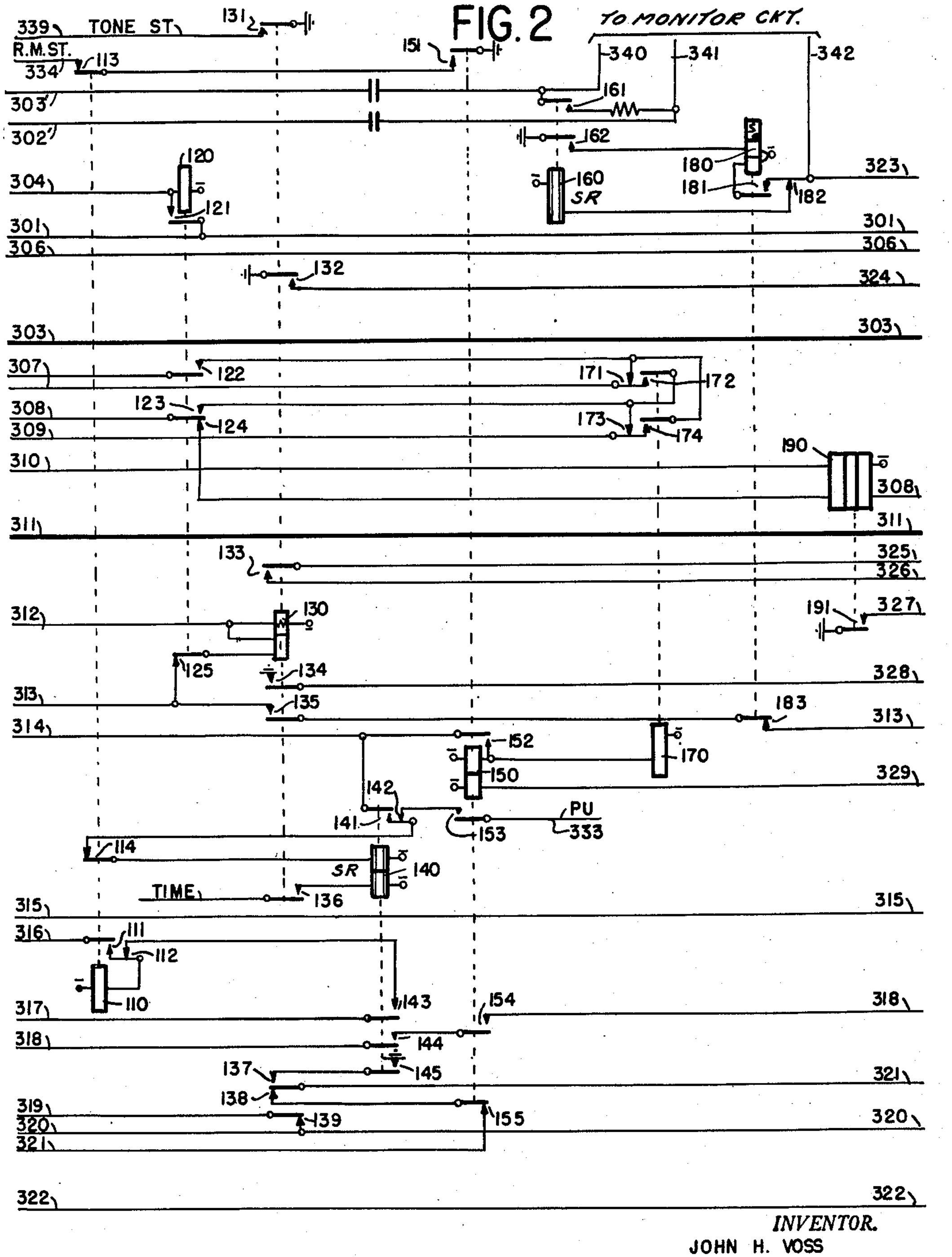
Figure 3:
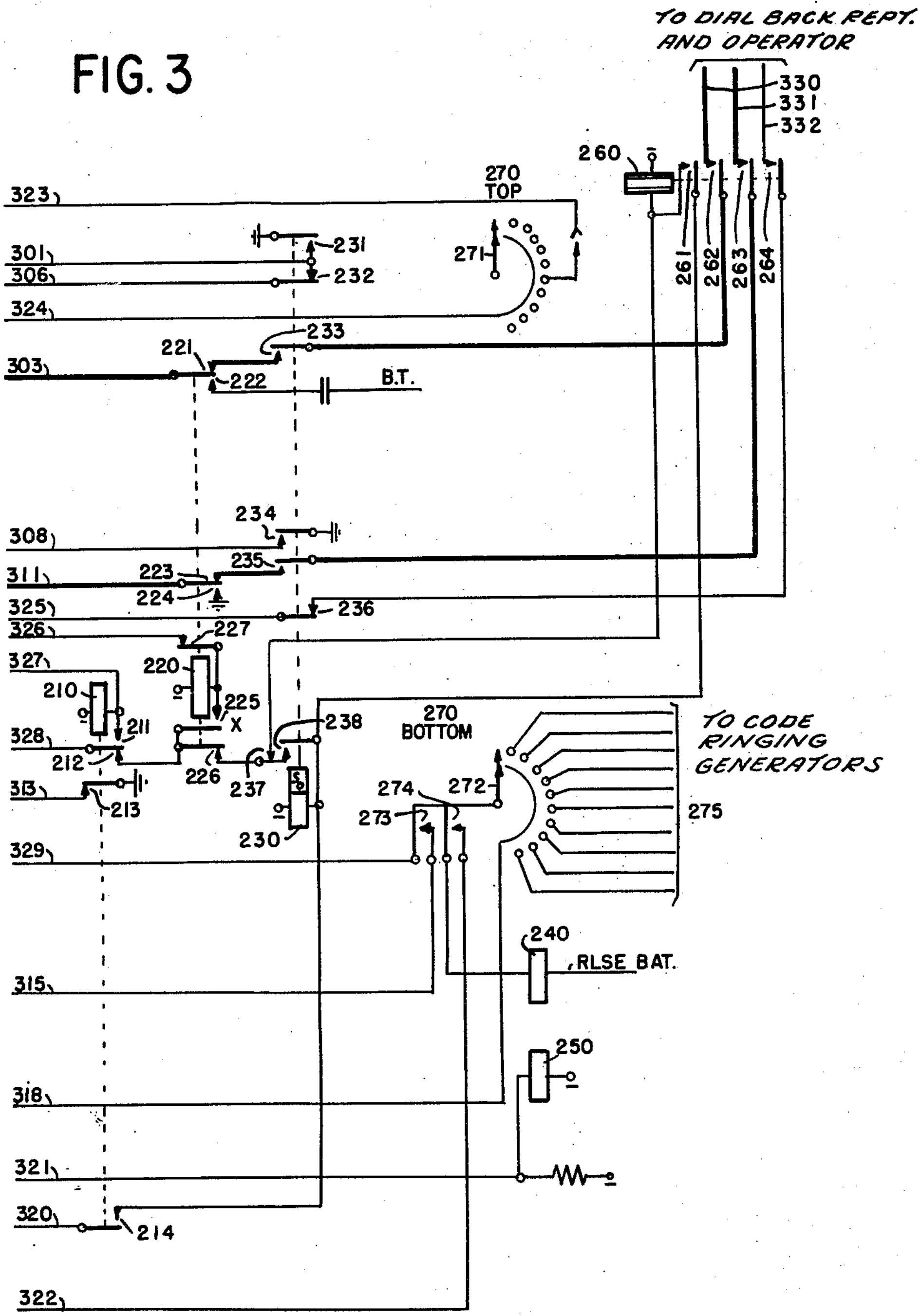

Further features will be apparent from the following specification, having reference to the accompanying drawings comprising Figures 1, 2 and 3 which illustrate a magneto line adapter circuit for use with an automatic exchange, shown connected to a magneto party line, and a manual switchboard.

Referring to the drawings, the system there illustrated comprises a magneto line adapter circuit with line connections 330, 331 and 332 extending to a dial back repeater in an automatic exchange, incoming lines 301, 302 and 303 which are accessible to a switch-thru connector or selector in the exchange, line connections 1 and 2 which extend to a magneto line having a plurality of subscribers, lines 333 and 334 which extend to ringing interrupter equipment, and tone generating equipment connected to lines 5 and 6 and tone start lead 339. The magneto line adapter circuit includes a series of relays arranged to operate responsive to seizure over the magneto lines 1 and 2 or over the lines 301, 302 and 303 extending from the automatic exchange. The circuit is effective to extend a call from the magneto line to the operator at the manual switchboard over lines 330, 331 and 332 when a ringing signal of greater length than a predetermined interval is received from a magneto subscriber. The equipment is further effective to extend incoming calls received over conductors 301, 302 and 303 to the magneto lines 1 and 2 and to provide sustained code ringing to subscribers on the magneto line.

Referring now to the operation of the system and considering first an incoming call over the magneto lines 1 and 2 which is to be extended to an operator at a manual switchboard over conductors 330, 331 and 332. The magneto station subscriber applies ringing current to the line in a well known manner for a period of at least 3 seconds, this being a long ring of greater duration than the ordinary long rings used for party line signalling, and a circuit is closed to relay 20 over conductors 1 and 2, contacts 11 and 13 and the left hand windings of repeater coil 7. Relay 20 operates and at its contact 21 completes an operating circuit to relay 50 over contacts 21 and 43. Relay 50 operates and at its contacts 51 completes an operating circuit to relay 60, at its contacts 52 completes a self-holding circuit over contacts 21 and 52, and at its contacts 53 prepares a circuit for relay 40. Relay 60 operates and at its contacts 61 and 62 completes an operating circuit to relay 40. Relay 40 operates and at its contacts 42 prepares a point in the shunting circuit of relay 130, at its contacts 43 opens the operating circuit to relay 50, at its contacts 44 completes a circuit to relay 30 over contacts 21, 43 and 44 and at its contacts 45 prepares a self-holding circuit. Relay 50 is held operated by the self-holding circuit extending over contacts 21 and 52. Relay 30 operates and at its contacts 31 opens the operating circuit to relay 60, at its contacts 32 prepares a further point in the operating circuit of relay 130, at its contacts 33 completes a self-holding circuit over contacts 21 and 33, and at its contacts 34 completes a multiple holding circuit to relay 40 over contacts 61, 62 and 34 and over contacts 61, 62 and 53. Relay 60 releases and at its contacts 61 opens the multiple holding circuits to relay 40, and releases its vibrating armature which intermittently opens and closes an alternate holding circuit to relay 40 over contacts 62 or 63, 45 and 34. Relay 40 holds during the vibrating period of the armature on relay 60. A short interval after the vibrating armature is restored to its normal position, relay 40 releases and at its contacts 41 completes a circuit to the #1 winding of relay 130, at its contacts 43 completes an operating circuit to relay 50, at its contacts 44 opens the operating circuit to relay 30 and at its contacts 45 opens a further point in its self-holding circuit. Relay 50 remains operated. Relay 30 holds over the self-holding circuits aforementioned. The operation of relays 30, 40 and 50 described above requires approximately 3 seconds. If the subscriber transmits a ringing signal of shorter duration than the operating time required by the aforementioned relays, relay 20 will release before the relay chain has fully operated and at its contacts 21 remove ground from the operating circuit for relay 30 which thereupon releases and at its contacts 32 opens a further point in the circuit to relay 130 prior to completion of that operating circuit by release of relay 40 at its contacts 41. In this manner, party stations on the magneto line may be assigned code rings consisting of a combination of long and short rings and these parties can signal one another without signaling the operator associated with the line. However, assuming a 3 second ring has been transmitted by the calling subscriber, an operating circuit is completed on release of relay 40 as described heretofore to the operating winding of relay 130 over contacts 32 and 41.

Relay 130 operates and at its contacts 131 completes a circuit to the tone start equipment, at its contacts 132 connects ground to the common terminal of the top bank of minor switch 270 over line 324, at its contacts 133 prepares a circuit from the CI lead 332 of the dial back repeater to relay 220, at its contacts 134 completes an operating circuit to relay 260 over contacts 134, line 328, contacts 212, 226, and 237, at its contacts 135 completes a self-holding circuit over contacts 213, lead 313, contacts 183, 135 and 125, at its contacts 136 connects the time lead to the #2 winding of relay 140, at its contacts 137 prepares a circuit for the minor switch rotary magnet 250, at its contacts 138 opens a further point in the impulsing circuit to the minor switch 250, and at its contacts 139 opens a further point in one of the multiple operating circuits for relay 230. Relay 260 operates and at its contacts 261 completes an operating circuit to relay 230, which is slow to operate, in multiple with itself over contacts 134, line 328, contacts 212, 226, 237 and 261, at its contacts 262 and 263 prepares part of the loop circuit through the top coil of relay 190 to leads 330 and 331, and at its contacts 264 completes the circuit from the CI lead 332 to relay 220 over contacts 236, lead 325, contacts 133, lead 326, and contacts 227. Relay 20 releases when the ringing current is terminated at the calling party station and at its contacts 21 opens the holding circuits to relays 30 and 50. Relay 30 at its contacts 32 opens the operating circuit to relay 130 which is held operated over its self-holding circuit heretofore described.

Assuming all trunks to the central office are busy, ground will be connected in a well known manner in the repeater to the CI lead 332. An operating circuit is completed to relay 220, before slow to operate relay 230 is operated, over contacts 264, 236, lead 325, contacts 133, lead 326, and contacts 227. Relay 220 operates and at its contacts 225 which close first completes a self-holding circuit over contacts 212 and 134, at its contacts 221, 222, 223 and 224 transfers the right hand side of the repeating coil to the busy tone lead and ground, at contacts 227 opens its own operating circuit and at contacts 226 opens the operating circuits passing over lead 328 to relays 230 and 260. Relay 260 restores and at its contacts 262 and 263 opens the incomplete transmission circuit to the associated dial back repeater, and at its contacts 261 opens the operating circuit to relay 230 before it has a chance to operate. Busy tone is induced over contacts 222 and line 303 into the left hand winding of the repeater whereby it is returned to the calling party. Relays 130 and 220 remain energized. The calling party, on receipt of the busy tone, applies ringing current to the line for a brief period whereupon relays 20, 50, 60, 40 and 30 reoperate and relay 30 at its contacts 32 closes a shunting circuit to the #1 winding of relay 130. Relay 130 releases and at its contacts 135 opens its self-holding circuit and the holding circuit to relay 200 and restores the adapter circuit to normal condition.

If the central office is not busy, relay 220 will not be operated over the CI conductor 332 and relay 230 will be operated after a short interval. Relay 230 at its contacts 231 and 232 transfers the connector lead to direct ground, at its contacts 233 and 235 completes the loop circuit through the right hand side of the repeating coil 7 and a circuit for the top winding of relay 190, at its contacts 234 completes the operating circuit to the polarizing winding of relay 190, at its contacts 237 and 238 transfers its own operating circuit and the operating circuit of relay 260 to holding circuits. The polarity of the leads 330 and 331 is such as to prevent operation of relay 190. The dial back repeater is seized by the loop across leads 330 and 331 and the operator is signalled. Relays 130, 230 and 260 are in the energized condition.

When the operator in the central office answers the call, battery on the leads 330 and 331 is reversed and the two windings on relay 190 are polarized in the same direction. Relay 190 operates and at its contacts 191 completes an operating circuit to relay 210. Relay 210 operates and at its contacts 211 completes a self-holding circuit over contacts 134, lead 328, and contacts 211, at its contacts 212 opens the holding circuits to relays 230 and 260, at its contacts 213 opens the holding circuit to relay 130, and at its contacts 214 prepares an alternate circuit to relays 230 and 260. Relays 230 and 260 are slow to release. Relay 130 releases immediately and at its contacts 131 opens the operating circuit to the tone equipment, at its contacts 136 disconnects the time lead from the lower winding of relay 140, at its contacts 139 completes a holding circuit over contacts 72, lead 319, contacts 139, lead 320, contacts 214 to relays 230 and 260 prior to their release. Relays 190, 210, 230 and 260 are in the operated condition and voice currents may be transmitted through the magneto adapter circuit from subscriber to operator and vice versa. This circuit supplies no battery for transmission on calls from the magneto line. Voice currents are transmitted by induction through the repeating coil.

In the event that the subscriber on the magneto line failed to ring off when all trunks were busy or abandoned the call before completion, relays 130 and 220 or possibly 130, 220 and 260 would be left in the energized condition. Relay 130 at its contacts 136 completed a circuit from the time lead to the operating winding of relay 140. After a predetermined time, the associated timer closes a ground pulse to the time lead and relay 140. Relay 140 operates and at its contacts 141 and 142 prepares a self-locking circuit, at its contacts 143 prepares a circuit to relay 110, and at its contacts 145 completes an operating circuit to the rotary magnet 250 of the minor switch 270. The rotary magnet of the minor switch operates stepping the wipers 271 and 272 to the first bank contacts and operating the minor switch off normal springs 273 and 274. The off normal springs close and prepare the circuits to the release magnet 240 and relay 150. On termination of the ground applied to the time lead, relay 140 releases and at its contacts 145 opens the operating circuit to the rotary magnet 250. The rotary magnet 250 releases. A ground pulse is transmitted over the time lead every 30 seconds. Relay 140 operates each time a pulse is received and effects operation of the rotary magnet causing the minor switch to advance one step. This operation continues until the wiper 271 reaches the contact to which lead 323 is connected, at which time an operating circuit is completed to relay 160 over contacts 132, wiper 271, the contact of the minor switch to which lead 323 is connected and contacts 182. Relay 140 and the rotary magnet 250 release as described above when the ground is removed from the time lead. Relay 160 operates and at its contacts 161 inserts a 500 ohm resistor across the connector leads 340 and 341, at its contacts 162 completes an operating circuit to relay 180. Relay 180 operates and at contacts 181 closes its own locking circuit over contacts 132, lead 324, the top bank of minor switch 270, wiper 271, the previously determined bank contact to which lead 323 is fastened and contacts 181, at its contacts 182 opens the operating circuit to relay 160, and at its contacts 183 opens the holding circuit to relay 130. Relay 160 restores and at its contacts 162 opens the operating circuit to relay 180 which holds over the self-holding circuit described above. Relay 130 restores and at its contacts 131 terminates operation of the tone equipment, at its contacts 132 opens the holding circuit to relay 180, at its contacts 133 opens a further point in the operating circuit for relay 220, at its contacts 134 opens the holding circuit to relay 220, which will be in the operated condition in the event the calling subscriber failed to ring off on receipt of an all trunks busy signal, or relays 230 and 260, which are in the operated condition in the event that the calling subscriber abandoned the call, at its contacts 135 opens a further point in its own holding circuit, at its contacts 136 disconnects the time lead from the lower winding of relay 140, and at its contacts 139 completes an operating circuit to the release magnet 240 over contacts 72, lead 319, contacts 139, lead 320, contacts 85, lead 322, and the off normal springs 274. The minor switch release magnet 240 operates restoring its wipers to normal and releasing the off normal springs 273 and 274, thereby opening the operating circuit to the release magnet. Release magnet 240 restores. Relay 180 restores. Relay 220 or relays 230 and 260 restore. Normal circuit conditions now exist and the circuit is ready for subsequent calls.

If another party on the magneto line should attempt a call while the circuit is in the partially energized condition as a result of a first party's failure to ring off on receipt of a busy tone, the second subscriber will receive busy tone when his receiver is lifted. Obviously, the second subscriber can restore the set to normal by ringing off as described heretofore and then ringing the operator to establish his connection. If the circuit was left in a partially energized condition as a result of an abandoned call, the second subscriber will receive ring-back tone and after determining by inquiry as to whether the line is busy or abandoned can ring off as heretofore described and then apply the long ring to signal the operator. Means are also available to the operator for releasing the circuit before the automatic release can be effected and will be more fully explained at a further point in the disclosure.

Assuming now that the parties have completed their call, relays 190, 210, 230 and 260 operated, the release of the connection is under the control of the operator. The calling party hangs up and applies ringing current to the line as a ring-down signal. The connection extending over the loop to the operator is opened on receipt of the ring-down signal at the adapter circuit in a manner heretofore described and the operator is informed that the call is terminated.

If the call has been completed to an automatic subscriber, the operator will release the connection on receipt of the signal extended by the automatic subscriber when his receiver is restored. When the operator disconnects the current through the top winding of relay 190 is reversed. Relay 190 releases and at its contacts 191 opens the circuit to relay 210. Relay 210 at its contacts 214 opens the operating circuits to relays 230 and 260 which release and restore the circuit to its normal condition. If the call has been completed to another magneto subscriber, the connection is released by ring-down signals applied to the line by the subscribers as heretofore described.

Assuming now a call is to be completed to a subscriber on the magneto line connected to lines 1 and 2, the magneto adapter circuit is arranged to be seized through the banks of a standard Strowger type switch-through connector or selector connected to incoming leads 301, 302 and 303. When the connector is seized and operated to seize the illustrated adapter circuit, the calling line loop is closed across the leads 302 and 303, and ground is connected to lead 301. Relay 120 is operated over lead 304, contacts 81, lead 306, contacts 232 and lead 301, and at its contacts 121 completes a self-locking circuit to lead 301, at its contacts 122 and 123 connects relay 70 to the incoming lines 302 and 303 through the right hand winding of repeater coil 7, at its contacts 124 opens the circuit to the upper winding of relay 190 and at its contacts 125 opens a further point in the circuit to relay 130. Relay 70 operates and at its contacts 71 completes an operating circuit to relay 80 and at its contacts 72 opens a further point in the circuit to the release magnet 240 and relay 230. Relay 80 operates and at its contacts 81 opens the operating circuit to relay 120, at its contacts 121 connects ground to relay 120 over lead 306, contacts 232, lead 301 and contacts 121 and also to the C lead 301 of the connector to hold the preceding switch train operated after the preceding switch has removed its temporary ground from lead 301, at its contacts 83 prepares a circuit to the upper winding of relay 140 and relay 110, at its contacts 84 prepares a circuit to relay 90 and the rotary magnet 250 in multiple, and at its contacts 85 opens a further point in the release magnet circuit. The circuit is now prepared for receipt of the impulses, which represent the last digit of a group, to select the code which is to be used in ringing the desired subscriber. Relay 70 operates responsive to the impulses representing the digit and at its contacts 71 opens and closes the circuit to relay 80 and at its contacts 72 opens and closes the operating circuit to the rotary magnet 250 and to relay 90 over contact 72, lead 319, contacts 139, lead 320, contacts 84, lead 321, contacts 155, 138 and lead 321. Slow to release relays 80 and 90, operate on the first impulse and remain operated for the duration of the impulses. Relay 90 at its contacts 91 short circuits the lower half of the right hand side of repeating coil 7 to improve impulsing conditions and at its contacts 92 opens a further point in the circuit to the lower winding of relay 150. The rotary magnet 250 follows the impulses and effects operation of the wipers 271 and 272 one step for each pulse. Incident to the first step of the switch, off normal springs 273 and 274 are operated and prepare operating circuits for the lower winding of relay 150 and release magnet 240. After the last impulse relay 70 remains in the operated condition and at its contacts 71 maintains an operating circuit for relay 80 and at its contacts 72 opens the circuit to the rotary magnet 250 and relay 90. A short interval later relay 90 releases and at its contacts 91 opens the short circuit to the lower part of the right hand winding of repeater 7 and at its contacts 92 completes an operating circuit to the lower winding of relay 150 over contacts 83, 92, lead 315, off normal springs 273 and lead 329. Relay 150 operates and at its contacts 151 closes ground to the R. M. ST lead to start the ringing machine, at its contacts 152 completes a self-holding circuit over contacts 83, lead 314, and contacts 152 in multiple with an operating circuit to relay 170, at its contacts 153 connects the PU lead 353 of the ringing interrupter to the upper winding of relay 140, at its contacts 154 prepares a circuit for the A. C. relay 10 from the selected generator lead of group 275, and at its contacts 155 opens a further point in the operating circuit to rotary magnet 250. Relay 170 operates and at its contacts 172 and 174 reverses ground and battery over the closed loop comprising the upper and lower winding of relay 70, leads 307 and 309, contacts 172 and 174, contacts 122 and 123, leads 308 and 310, the right hand windings of repeating coil 7 and the conductors 302 and 303. The ringing interrupter circuit closes a ground pulse to the pickup lead 333 just before the beginning of each code cycle. Relay 140 operates responsive to the ground pulse over lead 333, contacts 153, 142 and 114 and at its contacts 141 completes a self-holding circuit over contacts 83, lead 314, contacts 141 and 114, at its contacts 142 opens the operating circuit from lead 333, at its contacts 143 prepares an operating circuit to relay 110, at its contacts 144 completes the operating circuit to relay 10 from the generator lead selected by the minor switch 270, wiper 272, lead 318, contacts 154 and 144, and at its contacts 145 closes a point in the circuit to the rotary magnet 250. The code assigned to the desired subscriber is transmitted by the selected generator lead to relay 10. Relay 10 operates responsive to the ringing current and at its contacts 12 and 14 connects the generator leads 5 and 6 to the magneto lines 1 and 2 to ring the telephones associated with this line in accord with the ringing current applied to relay 10. The code is repeated over the line until the subscriber answers by applying ringing current to the line during the interval between code rings or until the calling party hangs up. The condensers 3 and 4 bridged across the back contacts of relay 10 allow a small amount of ringing current to flow through the left hand windings of repeater coil 7 to return ringback tone to the calling line.

When the called party applies the ringing current for at least 3 seconds to the line in the well known manner to terminate the code ring, relays 20, 50, 60, 40 and 30 operate in the manner heretofore described and an operating circuit is completed to relay 110 over contacts 21, 33, 317, 143 and 112. Relay 20 and the aforementioned relays release on termination of the applied current as heretofore described. Relay 110 operates and at its contacts 111 completes a self-holding circuit over contacts 83 and 111, at its contacts 112 opens its operating circuit, at its contacts 113 opens the ground connection to the ringing machine, and at its contacts 114 opens the holding circuit to relay 140. Relay 140 releases and at its contacts 141 further opens its self-holding circuit, at its contacts 142 prepares its operating circuit, at its contacts 145 opens a point in the circuit to the rotary magnet 250, and at its contacts 144 opens a point in the circuit to relay 10 to terminate the operation and application of the ringing signal to the magneto line. The circuit is now set up for voice transmission, with relays 70, 80, 110, 120, 150 and 170 in the operated condition. Transmission battery is supplied to the calling line through the winding of relay 70 and to the called magneto line by a local battery at the station.

When the calling party restores his receiver, i. e., after the call is completed or in the event the called party does not answer, the loop circuit to relay 70 is opened. Relay 70 releases and at its contacts 71 opens the operating circuit to slow to release relay 80, and at its contacts 72 completes an operating circuit to relay 90 over contacts 72, lead 319, contacts 139, lead 320 and contacts 85 before relay 80 has sufficient time to operate. Relay 90 operates and at its contacts 92 opens the locking circuit to relay 150 which releases and at its contacts 152 opens the holding circuit to relay 170. Relay 170 releases and at its contacts 171, 172, 173 and 174 reverses battery to the line connection. A short interval later, relay 80 releases and at its contacts 82 disconnects ground from the C lead 301 to release relay 120 and the preceding switches and condition the line for subsequent calls, at its contacts 83 opens the holding circuit to relay 110, at its contacts 84 opens the operating circuit to relay 90, and at its contacts 85 completes an operating circuit to release magnet 240 over contacts 72, lead 319, contacts 139, lead 320, contacts 85, lead 322, and off normal springs 274. Relay 90 and 120 release. The release magnet 240 operates and restores the minor switch 270 to normal. Off normal springs 274 release and open the operating circuit to the release magnet 240. The circuit is now restored to its normal condition.

The circuit is further provided with verification service whereby an operator may monitor a connection by dialing the special verification number assigned to the line through a standard Strowger type connector which seizes the circuit over lines 340, 341 and 342. Battery connected to the C lead 342 through contacts 182 and relay 160 effect operation of the connector to connect ground to the conductor 342 and thereby complete an operating circuit to relay 160. Relay 160 operates and at its contacts 161 completes a 500 ohm shunt across the conductors 340 and 341 to operate the ring trip relay in the connector, which thereupon operates and effects completion of a transmission circuit through the connector, and at its contacts 162 completes an operating circuit to relay 180. Relay 160 is slow to release and relay 180 is slow to operate to allow sufficient time for the ring trip relay in the connector to operate before the 500 ohm shunt is removed from lines 340 and 341. Relay 180 operates and at its contacts 181 closes a self-holding circuit over the C lead 342 and at its contacts 182 opens the operating circuit to relay 160. Relay 160 operates and removes the 500 ohm shunt from the lines 340 and 341, and at its contacts 162 opens the operating circuit to relay 180 which holds up over C lead 342 until such time as the operator disconnects to release the connector and consequently relay 180. The operator may listen or talk over leads 340 and 241 with the parties using the circuit.

The verification number may also be used whenever the calling magneto party fails to ring off after finding all trunks busy as heretofore described. Relays 130 and 220 will be in the operated condition. The circuit will release automatically, but in the event that the operator wishes to accelerate release of the circuit, she dials the verification number. Relays 160 and 180 operate as described above and relay 180 at its contacts 183 opens the circuit to relay 130. Relay 130 releases and at its contacts 134 opens the holding circuit to 220. Relay 220 releases. If the minor switch has been stepped off normal, relay 130 at its contacts 139 completes a circuit to release magnet 240 over contacts 72, lead 319, contacts 139, lead 320, contacts 85, lead 322, and off normal springs 274. Release magnet 240 operates and effects release of minor switch 270. The off normal springs 274 are opened incident to release of the switch and the operating circuit to the release magnet is opened and the circuit is restored to normal.

While a particular embodiment of the invention has been described, it will be understood that various modifications may be made therein which are within the time, spirit and scope of the invention.

What is claimed is:

1. In a telephone system, a called line comprising a plurality of magneto substations, an automatic exchange including therein a first means for transmitting impulses, an adapter circuit connected to said automatic exchange and to said called line for extending a connection from said automatic exchange to said called line, a second means included within said adapter circuit and operated in response to receipt of impulses from said automatic exchange, a third means in said adapter circuit for providing sustained code ringing for selectively signalling a substation of said called line operated in response to the operation of said second means, a hand generator connected to said called line, and relay means in said adapter circuit operated in response to the ringing current of said hand generator of said called line for terminating said sustained code ringing.

2. In a telephone system, a called subscriber's line comprising a plurality of magneto substations, an automatic exchange including therein a first means for transmitting impulses, an adapter circuit individually connected to said called subscriber's line for extending a connection to said called subscriber's line, an incoming call line connecting said automatic exchange to said adapter circuit, a second means included within said adapter circuit and operated in response to receipt of impulses over said incoming call line from said automatic exchange, a third means for providing sustained code ringing for selectively signalling a substation of said called subscriber's line operated in response to the operation of said second means, a hand generator connected to said called subscriber's line for applying ringing current to said called subscriber's line, and relay means operated in response to the ringing current of said hand generator at said called subscriber's line for terminating said sustained code ringing.

3. In a telephone system, a line comprising a plurality of magneto substations, an automatic exchange, an operator's position, an adapter circuit connected to said line and including a plurality of paths, one of said paths connecting said line to said operator's position, another of said paths connecting said automatic exchange to said line, means included within said adapter circuit for providing sustained code ringing for selectively signalling a substation of said line in response to an incoming call over said other path from said automatic exchange, a ringing generator connected to said line and operated for applying ringing current to said line, relay means operated in response to the ringing current of said ringing generator, means responsive to said relay means in case a call is initiated over said line for said operator's position for signalling said operator's position over said first path, and other means responsive to said relay means in case a call is extended to said line over said other path for terminating said sustained code ringing.

4. In a telephone system, a called line comprising a plurality of magneto substations, an automatic exchange including therein a first means for transmitting impulses, an adapter circuit connected to said line and to said automatic exchange for extending a connection from said automatic exchange to said called line, a second means included within said adapter circuit and operated in response to receipt of impulses from said automatic exchange, means responsive to the operation of said second means to provide sustained code ringing for selectively signalling a substation of said called line, a hand generator connected to said called line for applying ringing current to said called line for a predetermined time duration, a line relay included within said adapter circuit and operated in response to the ringing current of said hand generator at said called line, means including a group of relays in said adapter circuit operated only in response to energization of said line relay for a predetermined time duration, and a ring-stop relay and circuit operated in response to the operation of said last means to provide for the termination of said sustained code ringing.

5. In a telephone system, a line comprising a plurality of magneto substations, each of said magneto substations having a different ringing code assigned thereto, an automatic exchange including therein a first means for transmitting impulses indicative of said ringing codes, an adapter circuit connected to said automatic exchange and said line for extending a connection from said automatic exchange to said line, a plurality of code ringing conductors each corresponding to a different code, means in said adapter circuit operated in response to the receipt of a series of impulses indicative of one of said ringing codes received from said automatic exchange for selecting one of said ringing conductors corresponding to such ringing code, a ringing relay, a circuit closed after said selection for connecting said selected one ringing conductor to said ringing relay, coded current pulses repeatedly connected to said selected one ringing conductor repeatedly operating said ringing relay over said closed circuit in accordance with said coded current pulses, a source of generator current, means for connecting said source to said line each time said ringing relay is operated to code ring over said line in accordance with said selected code ring conductor, a magneto generator connected to said line for applying ringing current to said line for a predetermined time duration, a line relay included within said adapter circuit and operated in response to the ringing current of said magneto generator, means including a group of relays operated only in response to the energization of said line relay for a predetermined time duration, and a ring-stop relay and circuit operated in response to the operation of said last means for opening said closed circuit to said ringing relay to stop further operations of said ringing relay for terminating said code ringing.

6. In a telephone system, a line comprising a plurality of magneto substations, an automatic exchange including therein a first means for transmitting impulses, an adapter circuit connected to said line and said automatic exchange for extending a connection from said automatic exchange to said line, a plurality of code generators, a minor switch in said adapted circuit, means for stepping said minor switch to select and connect with a particular code generator in response to the impulses transmitted from said automatic exchange, a ringing relay operated in response to the code current of said selected code generator, a ringing generator connected to said line in response to the operations of said ringing relay to provide repeated code ringing current to said line, a hand generator connected to said line for applying ringing current to said line, a group of relays, means for operating all the relays of said group of relays only in response to the ringing current of said hand generator being applied for a predetermined time duration, and a ring-stop relay and circuit operated in response to the operation of said group of relays for terminating said repeated code ringing.

7. In a telephone system, a line comprising a plurality of magneto substations, an automatic exchange including therein a first means for transmitting impulses, an adapter circuit connected to said line and to said automatic exchange for extending a connection from said automatic exchange to said line, a plurality of code generators each corresponding to a different code, a minor switch, a connect relay in said adapter circuit operated in response to said automatic exchange originating a call over said connection to said adapter circuit, a pulsing relay in said adapter operated in response to the operation of said connect relay, said pulsing relay being responsive to the impulses transmitted by said first means in said automatic exchange for repeating said impulses, means in said adapter circuit for stepping said minor switch to select and connect with one of said code generators in response to said repeated impulses transmitted by said pulsing relay, a ringing relay operated in response to the code current of said selected one code generator, a ringing generator connected to said line in response to the operations of said ringing relay to apply repeated code ringing current to said line, a magneto generator connected to said line for applying ringing current to said line, relay means operated only in response to the ringing current of said magneto generator being applied for a predetermined time duration, and circuit means operated in response to the operation of said relay means for preventing a reoperation of said ringing relay to thereby terminate said repeated code ringing.

8. In a telephone system, a line comprising a plurality of magneto substations, an automatic exchange, an operator's position, an adapter circuit connected to said line and including a plurality of paths, one of said paths connecting said line to said operator's position, another of said paths connecting said automatic exchange to said line, means included within said adapter circuit for providing sustained code ringing for selectively signalling a substation of said line in response to an incoming call over said other path from said automatic exchange, a magneto connected to said line and operated at one of said substations for applying ringing current to said line for varying durations, the application of said ringing current to said line for short durations being used to selectively signal other substations on said line, relay means in said adapter circuit operated only in response to the ringing current of said ringing generator being applied for a predetermined time duration, means responsive to said relay means in case a call is initiated over said line for said operator's position for signalling said operator's position over said first path, and other means responsive to said relay means in case a call is extended to said line over said other path for terminating said sustained code ringing.

JOHN H. VOSS.

REFERENCES CITED

The following references are of record in the file of this patent:

UNITED STATES PATENTS

| Number | Name | Date |
|---|---|---|
| 1,127,889 | Hinrichsen | Feb. 19, 1915 |
| 2,100,523 | Saunders | Nov. 30, 1937 |
| 2,137,408 | Lill | Nov. 22, 1938 |